(12) United States Patent
Kim (10) Patent No.: US 12,539,774 B2
(45) Date of Patent: Feb. 3, 2026

(54) METHOD FOR CONTROLLING ELECTRIC VEHICLE

(71) Applicants: Hyundai Motor Company, Seoul (KR); Kia Corporation, Seoul (KR)

(72) Inventor: Gwi Chul Kim, Anyang-Si (KR)

(73) Assignees: Hyundai Motor Company;, Seoul (KR); Kia Corporation, Seoul (KR)

( * ) Notice: Subject to any disclaimer, the term of this patent is extended or adjusted under 35 U.S.C. 154(b) by 217 days.

(21) Appl. No.: 18/382,295

(22) Filed: Oct. 20, 2023

(65) Prior Publication Data
US 2025/0026206 A1 Jan. 23, 2025

(30) Foreign Application Priority Data
Jul. 18, 2023 (KR) .................. 10-2023-0093069

(51) Int. Cl.
*B60L 15/20* (2006.01)
*B60K 23/08* (2006.01)

(52) U.S. Cl.
CPC ...... *B60L 15/2045* (2013.01); *B60K 23/0808* (2013.01); *B60L 2240/22* (2013.01); *B60L 2240/24* (2013.01); *B60L 2240/463* (2013.01); *B60L 2240/465* (2013.01); *B60L 2250/26* (2013.01); *B60L 2250/28* (2013.01)

(58) Field of Classification Search
CPC ............. B60L 15/2045; B60L 2240/22; B60L 2240/24; B60L 2240/463; B60L 2240/465; B60L 2250/26; B60L 2250/28; B60L 3/108; B60L 3/12; B60L 15/2009; B60T 8/1755;
(Continued)

(56) References Cited

U.S. PATENT DOCUMENTS 7,477,031 B2 * 1/2009 Ogata .................. B60W 10/02
318/434
10,363,918 B2 * 7/2019 Kim ..................... B60W 20/17
(Continued)

OTHER PUBLICATIONS

Kim, Gwi Chul et al., Presentation Materials "A Study on Energy Efficient Torque Distribution for Autonomous driving vehicle with 4 individual motors", The 30th Hyundai Motor Group Conference, Oct. 13, 2022; 17 slides.
(Continued)

*Primary Examiner* — Mussa A Shaawat
(74) *Attorney, Agent, or Firm* — MORGAN, LEWIS & BOCKIUS LLP (57) ABSTRACT

A method for controlling an electric vehicle may include receiving driving information including a requested driving torque, a requested braking torque, and a steering angle of a driver, from a detection unit, distributing a driving torque or a braking torque to a left wheel and a right wheel of the vehicle based on a predetermined reference yaw moment, to follow the requested driving torque or the requested braking torque, determining whether a vehicle state is a braking state, distributing a driving torque to a front wheel and a rear wheel of the vehicle according to an optimal total power loss curve minimizing a power loss of the vehicle, when the vehicle state is a driving state, and distributing a braking torque to the front wheel and the rear wheel by comparing a minimum tire slip curve and an ideal braking force distribution curve, when the vehicle state is the braking state.

17 Claims, 7 Drawing Sheets

(58) Field of Classification Search
CPC .............. B60T 8/1766; B60K 23/0808; B60K 2023/0858; B60W 30/045; Y02T 10/72
See application file for complete search history.

(56) References Cited

U.S. PATENT DOCUMENTS

| | | | | |
|---|---|---|---|---|
| 11,603,089 | B2* | 3/2023 | Wei | B60K 17/354 |
| 12,084,038 | B2* | 9/2024 | Sjödin | B60W 50/0097 |
| 2004/0070270 | A1* | 4/2004 | Gunji | B60L 7/10 |
| | | | | 903/917 |
| 2009/0145674 | A1* | 6/2009 | Lee | B60L 50/16 |
| | | | | 333/182 |
| 2012/0226399 | A1* | 9/2012 | Bergfjord | B60L 15/20 |
| | | | | 701/22 |
| 2012/0325573 | A1* | 12/2012 | Miller | B60L 50/16 |
| | | | | 180/282 |
| 2014/0207355 | A1* | 7/2014 | Akaho | B60L 3/108 |
| | | | | 701/70 |
| 2014/0257664 | A1* | 9/2014 | Arbitmann | B60T 8/17551 |
| | | | | 701/71 |
| 2015/0232080 | A1* | 8/2015 | Park | B60W 10/113 |
| | | | | 180/65.265 |
| 2016/0089982 | A1* | 3/2016 | Ienaga | B60L 3/106 |
| | | | | 701/22 |
| 2016/0090004 | A1* | 3/2016 | Ienaga | B60L 3/102 |
| | | | | 701/22 |
| 2016/0214645 | A1* | 7/2016 | Owen | B60W 10/22 |
| 2016/0264019 | A1* | 9/2016 | Drako | B60K 17/356 |
| 2017/0072945 | A1* | 3/2017 | Park | F02D 41/023 |
| 2017/0113716 | A1* | 4/2017 | Gong | B62D 21/00 |
| 2017/0246957 | A1* | 8/2017 | Ienaga | B60K 17/356 |
| 2019/0111790 | A1* | 4/2019 | Crombez | B60T 8/268 |
| 2019/0176801 | A1* | 6/2019 | Ruybal | B60K 6/52 |
| 2019/0263413 | A1* | 8/2019 | Hancock | B60K 1/00 |
| 2019/0344671 | A1* | 11/2019 | Shin | B60K 6/20 |
| 2021/0029385 | A1* | 1/2021 | Lee | B62J 50/40 |
| 2021/0078585 | A1* | 3/2021 | Collins | B60W 30/045 |
| 2021/0252983 | A1* | 8/2021 | Nahrwold | B60L 58/12 |
| 2023/0182579 | A1* | 6/2023 | Koga | B60W 10/20 |
| | | | | 303/152 |
| 2023/0364999 | A1* | 11/2023 | Pettersson | B60L 3/108 |

OTHER PUBLICATIONS

Kim, Gwi Chul et al., "A Study on Energy Efficient Torque Distribution for Autonomous driving vehicle with 4 individual motors", The 30th Hyundai Motor Group Conference, Oct. 13, 2022; 8 pages.

* cited by examiner

METHOD FOR CONTROLLING ELECTRIC VEHICLE

CROSS-REFERENCE TO RELATED APPLICATION

The present application claims priority to Korean Patent Application No. 10-2023-0093069 filed on Jul. 18, 2023, the entire contents of which is incorporated herein for all purposes by this reference.

BACKGROUND OF THE PRESENT DISCLOSURE

Field of the Present Disclosure

The present disclosure relates to a method for controlling an electric vehicle, and more particularly, to a method for controlling an electric vehicle capable of improving electricity mileage of an electric vehicle.

Description of Related Art

As the development of electric vehicles becomes active, various types of electric vehicles are being released. In early electric vehicles, drive motors were provided only on front wheels, but recently, dual motor electric vehicles are being developed in which drive motors are provided on front and rear wheels, respectively. Furthermore, a 4-motor electric vehicle in which a driving motor is mounted on each of the four wheels is also being developed.

As the number of drive motors provided in an electric vehicle increases, torque distribution control, which distributes the torque applied to each wheel, is not only utilized for stability and handling performance of the vehicle, but also plays a large role in improving electricity mileage, i.e., a travel distance by a unit amount of electricity.

Therefore, to realize optimal electricity mileage, research is required to generate the driver's requested torque while minimizing the power loss of the vehicle, and to secure the stability of the vehicle body.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a method for controlling an electric vehicle configured for securing the stability of the vehicle body while improving electricity mileage of an electric vehicle.

A method for controlling an electric vehicle may include receiving driving information including a requested driving torque, a requested braking torque, and a steering angle of a driver, from a detection unit, distributing, by a controller, a driving torque or a braking torque to a left wheel and a right wheel of the vehicle based on a predetermined reference yaw moment, to follow the requested driving torque or the requested braking torque, determining, by the controller, whether a vehicle state is a braking state, distributing a driving torque to a front wheel and a rear wheel, by the controller, according to an optimal total power loss curve minimizing a power loss of the vehicle, when the vehicle state is a driving state, and distributing a braking torque to the front wheel and the rear wheel, by the controller, by comparing a minimum tire slip curve and an ideal braking force distribution curve, when the vehicle state is the braking state.

The method may further include determining, by the controller, whether a yaw error is between a first error amount and a second error amount, and feedback-controlling the driving torque or the braking torque of the left wheel and the right wheel determined based on the reference yaw moment, when the yaw error is between the first error amount and the second error amount greater than the first error amount.

The reference yaw moment may be compensated through an equation of $$M_z^{HL} = M_z^{ref} + k_{p,\dot\psi}(\dot\psi_{ref} - \dot\psi) + k_{i,\dot\psi}\int(\dot\psi_{ref} - \dot\psi)dt, \text{ where, } M_z^{HL}$$

is a compensated yaw moment, $M_z^{ref}$ is the reference yaw moment, $k_{p,\dot\psi}$ is a proportional gain, $\dot\psi_{ref}$ is a reference yaw rate, $\dot\psi$ is the yaw rate, and $k_{i,\dot\psi}$ is an integral gain.

The driving torque or the braking torque of the left wheel may be determined by an equation of $$T_L = \frac{1}{2}\left(T_{total} - \frac{2R}{w}M_z^{HL}\right),$$

and the driving torque or the braking torque of the right wheel is determined by an equation of $$T_R = \frac{1}{2}\left(T_{total} + \frac{2R}{w}M_z^{HL}\right),$$

where $T_{total}$ is a total driving torque or a total braking torque.

When the yaw error is greater than or equal to the second error amount, a braking torque or a driving torque of the left wheel and the right wheel may be determined by a vehicle dynamics control module.

The method may further include determining, by the controller, whether a wheel slip is greater than or equal to a reference slip amount, and determining, by a vehicle dynamics control module, a braking torque or a driving torque of the left wheel and the right wheel, when the wheel slip is greater than or equal to the reference slip amount.

When the minimum tire slip curve exceeds the ideal braking force distribution curve, the braking torque may be distributed to the front wheel and the rear wheel according to the optimal total power loss curve.

When the minimum tire slip curve is smaller than or equal to the ideal braking force distribution curve, the braking torque may be distributed to the front wheel and the rear wheel according to the optimal total power loss curve until the minimum tire slip curve and the ideal braking force distribution curve coincide with each other, and the braking torque may be distributed to the front wheel and the rear wheel according to the ideal braking force distribution curve from a time point when the minimum tire slip curve and the ideal braking force distribution curve coincide with each other.

A computer-readable medium may store a program for executing, by a computer including a processor configured to execute a program or instruction stored in a memory or a storage device, a method for controlling an electric vehicle according to the above.

According to a method for controlling an electric vehicle according to an exemplary embodiment of the present disclosure, the stability of the vehicle body may be secured while minimizing the power loss of the electric vehicle.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

It may be understood that the appended drawings are not necessarily to scale, presenting a somewhat simplified representation of various features illustrative of the basic principles of the present disclosure. The predetermined design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

The terminology used herein is for describing various exemplary embodiments only and is not intended to be limiting of the present disclosure. As used herein, the singular forms are intended to include the plural forms as well, unless the context clearly indicates otherwise. As used herein, the term "comprises" and/or "comprising" refers to the presence of specified features, integers, steps, acts, elements and/or components, but it should also be understood that it does not exclude a presence or an addition of one or more other features, integers, steps, acts, components, and/or groups thereof. As used herein, the term "and/or" includes any one or all combinations of one or more related items.

Additionally, it is understood that one or more of the below methods, or aspects thereof, may be executed by at least one controller. The term "controller" may refer to a hardware device that includes a memory and a processor. The memory is configured to store program instructions, and the processor is programmed to execute the program instructions to perform one or more processes which are described further below. The controller may be configured for controlling operation of units, modules, parts, devices, or the like, as described herein. Moreover, it is understood that the below methods may be executed by an apparatus including the controller in conjunction with one or more other components, as would be appreciated by a person of ordinary skill in the art.

Furthermore, the controller of the present disclosure may be embodied as non-transitory computer readable media including executable program instructions executed by a processor. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed throughout a computer network so that the program instructions are stored and executed in a distributed fashion, e.g., by a telematics server or a Controller Area Network (CAN).

The present disclosure will be described more fully hereinafter with reference to the accompanying drawings, in which embodiments of the present disclosure are shown. As those skilled in the art would realize, the described embodiments may be modified in various different ways, all without departing from the spirit or scope of the present disclosure.

The drawings and description are to be regarded as illustrative in nature and not restrictive, and like reference numerals designate like elements throughout the specification.

Furthermore, the size and thickness of each configuration shown in the drawings are arbitrarily shown for understanding and ease of description, but the present disclosure is not limited thereto, and for clearly illustrate several portions and regions, thicknesses thereof are increased.

The terms "module" and "unit" for components used in the following description are used only to make the specification easier. Therefore, these terms do not have meanings or roles that distinguish them from each other by themselves.

In describing embodiments of the present specification, when it is determined that a detailed description of the well-known art associated with the present disclosure may obscure the gist of the present disclosure, it will be omitted.

The accompanying drawings are provided only to allow embodiments included in the present specification to be easily understood and are not to be interpreted as limiting the spirit included in the present specification, and it is to be understood that the present disclosure includes all modifications, equivalents, and substitutions without departing from the scope and spirit of the present disclosure.

The sequence of operations or steps is not limited to the order presented in the claims or figures unless indicated otherwise. The order of operations or steps may be changed, several operations or steps may be merged, a certain operation or step may be divided, and a specific operation or step may not be performed.

Hereinafter, a method for controlling an electric vehicle according to an exemplary embodiment of the present disclosure is described in detail with reference to the drawings.

Figure 1:
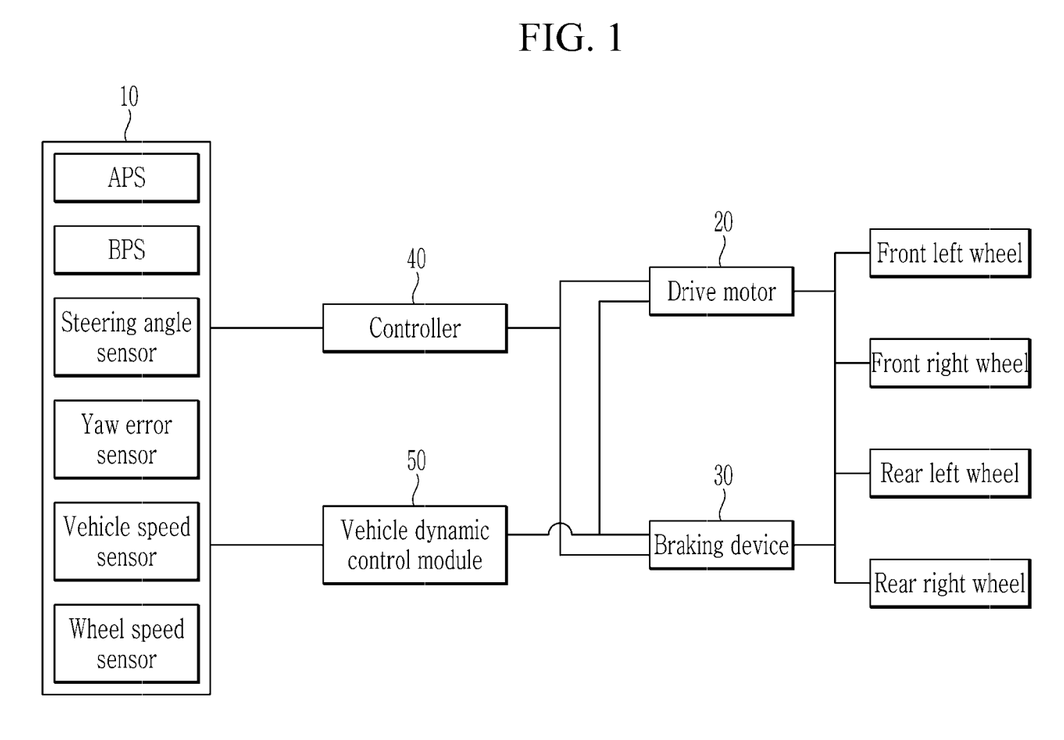
FIG. 1 is a block diagram showing a configuration of a control apparatus for controlling an electric vehicle according to an exemplary embodiment of the present disclosure.

FIG. 1 is a block diagram showing a configuration of a control apparatus for controlling an electric vehicle according to an exemplary embodiment of the present disclosure.

As shown in FIG. 1, a control apparatus for controlling an electric vehicle according to various exemplary embodiments of the present disclosure may include a detection unit 10, a drive motor 20, a braking device 30, and a controller 40.

The detection unit 10 may detect driving information required for driving the vehicle, and the driving information detected by the detection unit 10 may be transmitted to the controller 40. The driving information may include a requested driving torque, a requested braking torque, and a steering angle of a driver, and a yaw error (or, yaw rate) of the vehicle.

For such a purpose, the detection unit 10 may include an accelerator pedal sensor, a brake pedal sensor, a steering angle sensor, a yaw error sensor (or, yaw rate sensor), a vehicle speed sensor, and a wheel speed sensor. The driver's requested driving torque may be determined from an operation amount of the accelerator pedal. For the present purpose, the accelerator pedal sensor (APS) may detect the operation amount of the accelerator pedal, and the detected operation amount of the accelerator pedal may be transmitted to the controller 40. The operation amount of the accelerator pedal may mean the degree of pressing (or stepping on) the accelerator pedal by the driver, and the operation amount of the accelerator pedal may be determined to be 0% to 100%. For example, when the driver presses the accelerator pedal as much as possible, the operation amount of the accelerator pedal may be 100% (i.e., a state that the driver has fully pressed the accelerator pedal), and when the driver does not press the accelerator pedal, the operation amount of the accelerator pedal may be 0% (i.e., a state that the driver has fully released the accelerator pedal). The driver's requested driving torque may be determined from the operation amount of the accelerator pedal.

The driver's requested braking torque may be determined from an operation amount of a brake pedal. The brake pedal sensor (BPS) may detect the operation amount of the brake pedal, and the detected operation amount of the brake pedal may be transmitted to the controller 40. The operation amount of the brake pedal may mean the degree of pressing (or stepping on) the brake pedal by the driver, and the operation amount of the brake pedal may be determined to be 0% to 100%. For example, when the driver presses the brake pedal as much as possible, the operation amount of the brake pedal may be 100% (i.e., a state that the driver has fully pressed the brake pedal), and when the driver does not press the brake pedal, the operation amount of the brake pedal may be 0% (i.e., a state that the driver has fully released the brake pedal). The driver's requested braking torque may be determined from the operation amount of the brake pedal.

The steering angle may mean a rotation angle of a steering wheel, and when detected by the steering angle sensor, the detected steering angle may be transmitted to the controller 40.

The drive motor 20 generates a driving torque required for driving the vehicle by use of electrical energy charged in the battery, and the driving torque generated by the drive motor 20 is supplied to a drive wheel, or all wheels, of the vehicle, to drive the vehicle. The driving motor 20 may be configured to generate electrical energy by operating as a generator as needed (e.g., regenerative braking).

The drive motor 20 may be provided in the vehicle in a plural quantity. For example, the drive motor 20 may include a front wheel drive motor 20 and a rear wheel drive motor 20. The front wheel drive motor 20 may supply the driving torque to two front wheels, and the rear wheel drive motor 20 may supply the driving torque to two rear wheels. Alternatively, four driving motors 20 may be provided to supply driving torque to each wheel. In the instant case, driving torque may be supplied to each wheel through a driving motor 20 provided in each wheel.

The brake device 30 is a device that decelerates or stops the vehicle, and may include a master cylinder and a wheel brake, where the master cylinder generates a boosted hydraulic pressure when a driver operates the brake pedal and the wheel brake converts hydraulic pressure supplied from the master cylinder to generate a mechanical force, i.e., the braking force for restraining rotation of each wheel. The braking device 30 may brake each wheel independently.

The controller 40 may distribute driving torque and braking torque to each wheel based on the driving information detected by the detection unit 10.

To the present end, the controller 40 may be implemented with one or more processors that operate according to a preset program, and program instructions programmed to perform each step of a method according to an exemplary embodiment of the present disclosure through the one or more processor are stored in the memory of the controller.

If necessary, a control apparatus for controlling an electric vehicle according to various exemplary embodiments of the present disclosure may further include vehicle dynamics control module 50. The vehicle dynamics control module 50 stably maintains the vehicle body posture by independently controlling driving force and braking force of each wheel in an emergency situation. Depending on manufacturers or circumstances, the vehicle dynamics control module 50 may be referred to as other names such as a vehicle stability control module. The vehicle dynamics control module 50 may include electric stability control (ESC), anti-lock brake system (ABS), or the like.

According to an exemplary embodiment of the present disclosure, each of the vehicle dynamics control module 50 and the controller 40 may include a processor (e.g., computer, microprocessor, CPU, ASIC, circuitry, logic circuits, etc.) separately. Alternatively, the vehicle dynamics control module 50 and the controller 40 may be integrated to include a single processor.

Hereinafter, a method for controlling an electric vehicle according to an exemplary embodiment of the present disclosure will be described in detail with reference to the accompanying drawings.

Figure 2:
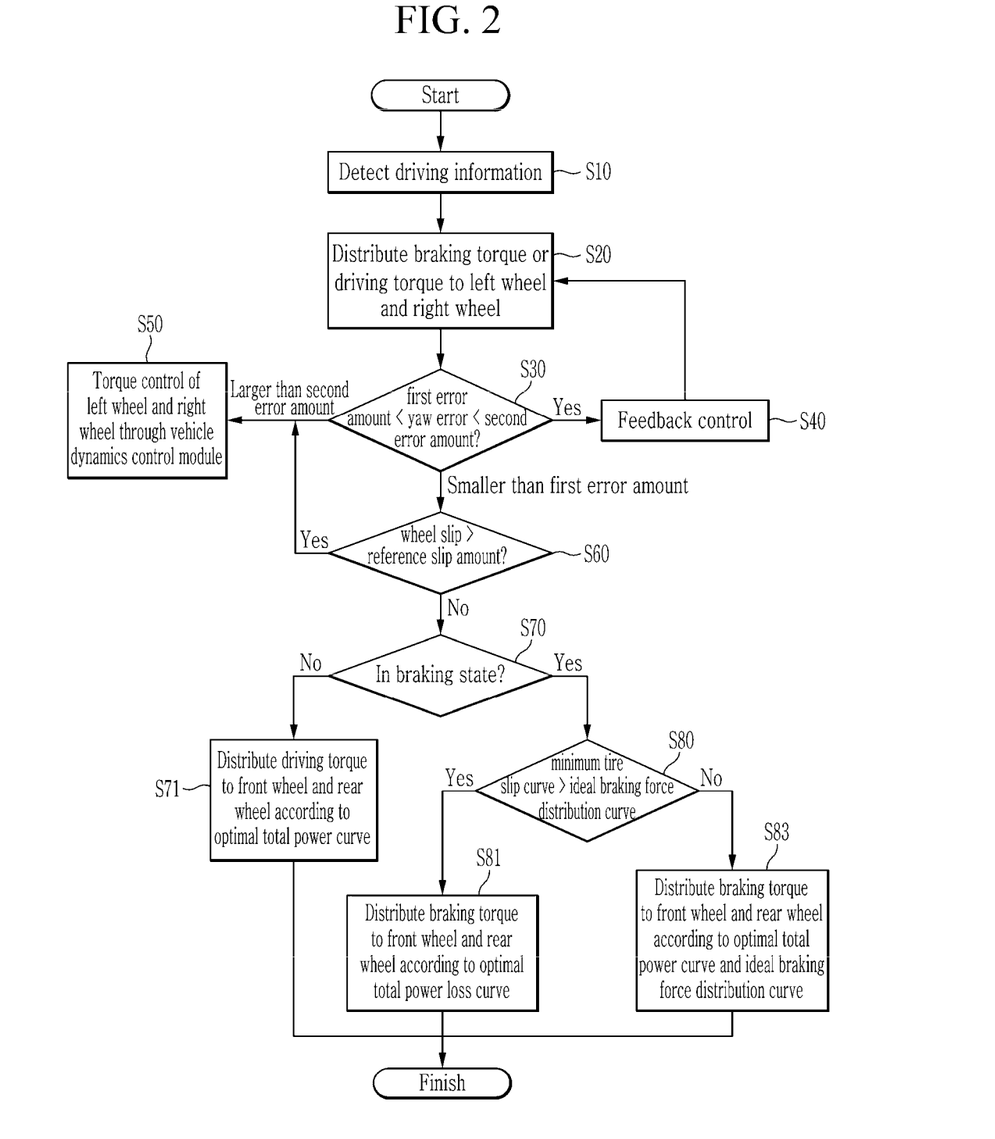
FIG. 2 is a flowchart showing a configuration of a method for controlling an electric vehicle according to an exemplary embodiment of the present disclosure.

FIG. 2 is a flowchart showing a configuration of a method for controlling an electric vehicle according to an exemplary embodiment of the present disclosure.

Referring to FIG. 2, at step S10, the detection unit 10 may detect the driving information due to the driver's operation, and the detected driving information may be transmitted to the controller 40.

At step S20, the controller 40 distribute driving torque or braking torque to a left wheel and a right wheel of the vehicle based on the driving information.

For example, when the vehicle is in a driving state as the driver operates the accelerator pedal, the requested driving torque determined by the operation amount of the accelerator pedal is distributed to the left wheel and the right wheel. Alternatively, when the vehicle is in a braking state as the driver operates the brake pedal, the requested braking torque determined by the operation amount of the brake pedal is distributed to the left wheel and the right wheel. At the instant time, the controller 40 may be configured to determine the left wheel driving torque and the right wheel driving torque applied to the left wheel and the right wheel based on a predetermined reference yaw moment.

Figure 3:
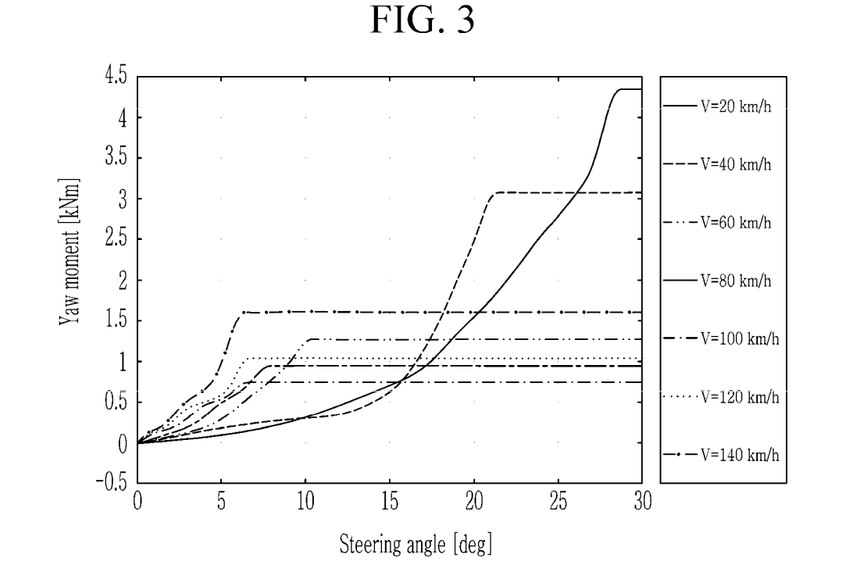
FIG. 3 is a graph for explaining a reference yaw moment according to an exemplary embodiment of the present disclosure.

At the present time, the controller 40 may be configured to determine a left-side driving torque and a right-side driving torque based on the predetermined reference yaw moment. The reference yaw moment may be determined according to the steering angle depending on vehicle speed. That is, the reference yaw moment determined according to the steering angle depending on vehicle speed may be stored in the memory of the controller 40 (refer to FIG. 3).

A left-side braking torque (or, the left-side driving torque) $T_L$ applied to the left wheel and a right-side braking torque (or, the right-side driving torque) $T_R$ applied to the right wheel may be determined through Equation 1 below.

$$T_L = \frac{1}{2}\left(T_{total} - \frac{2R}{w}M_z^{ref}\right)$$ [Equation 1]
$$T_R = \frac{1}{2}\left(T_{total} + \frac{2R}{w}M_z^{ref}\right)$$

Here, $T_{total}$ is a total braking torque (or, total driving torque), R is a rolling radius of the tire, w is an angular speed of each wheel, $M_z^{ref}$ is the reference yaw moment.

At step S30, the controller 40 is configured to determine whether the yaw error of the vehicle is between a first error amount and a second error amount.

At step S40, when the yaw error is between the first error amount and the second error amount, the controller 40 compensates the braking torque (or, driving torque) of the left wheel and the right wheel determined according to the reference yaw moment, through a feedback-control.

The braking torque (or, driving torque) of the left wheel and the right wheel compensated through the feedback-control may be determined as follows.

First, the reference yaw moment determined according to the steering angle depending on vehicle speed may be compensated through Equation 2 below.

$$M_z^{HL} = M_z^{ref} + k_{p,\dot\psi}(\dot\psi_{ref} - \dot\psi) + k_{i,\dot\psi}\int(\dot\psi_{ref} - \dot\psi)dt$$ [Equation 2]

Here, $M_z^{HL}$ is a compensated yaw moment, $M_z^{ref}$ is the reference yaw moment, $k_{p,\dot\psi}$ is a proportional gain, $\dot\psi_{ref}$ is a reference yaw rate, $\dot\psi$ is the yaw rate, and $k_{i,\dot\psi}$ is an integral gain.

Furthermore, the braking torque (or, driving torque) distributed to the left wheel and the right wheel based on the compensated yaw moment may be determined through the following Equations 3 and 4.

$$T_L = \frac{1}{2}\left(T_{total} - \frac{2R}{w}M_z^{HL}\right)$$ [Equation 3]

$$T_R = \frac{1}{2}\left(T_{total} + \frac{2R}{w}M_z^{HL}\right)$$ [Equation 4]

Here, $T_{total}$ is the total braking torque and/or total driving torque.

When the yaw error exceeds the second error amount at the S30 step, the braking torque and the driving torque of the left wheel and the right wheel are determined by the vehicle dynamics control module 50, at step S50. When the yaw error amount exceeds the second error amount, because it is more important to secure the posture stability of the vehicle body, the torque distribution control that minimizes the electricity mileage is terminated and the torques of the left and the right wheels are determined through the vehicle dynamics control module 50.

When the yaw error is smaller than the first error amount at the S30 step, the controller 40 is configured to determine whether a slip amount of the drive wheel exceeds a reference slip amount, at step S60.

When the slip amount of the drive wheel exceeds the reference slip amount, torques of the left wheel and the right wheel are determined by the separate vehicle dynamics control module 50, at the step S50. When the slip amount of the drive wheel exceeds the reference slip amount, because it is more important to secure the posture stability of the vehicle body, the torque distribution control that minimizes the electricity mileage is terminated and the braking torques (or driving torques) of the left and the right wheels are determined through the vehicle dynamics control module 50 at S50.

At step S70, when the slip amount of the drive wheel does not exceed the reference slip amount, the controller 40 is configured to determine whether the vehicle state is the driving state or the braking state. The driving state of the vehicle may be determined from the vehicle speed (or, acceleration) or the operation amount of the accelerator pedal, and the braking state may be determined from the vehicle speed (or, acceleration) or the operation amount of the brake pedal.

At step S71, when the vehicle state is the driving state, the controller 40 may distribute the driving torque to the front wheel and the rear wheel according to an optimal total power loss curve by which a power loss of the vehicle is minimized.

To achieve an optimal electricity mileage in a multi-motor vehicle in which the drive motor 20 is provided in a plural quantity, the driver's requested torque may be generated while minimizing the power loss of the vehicle.

Figure 4:
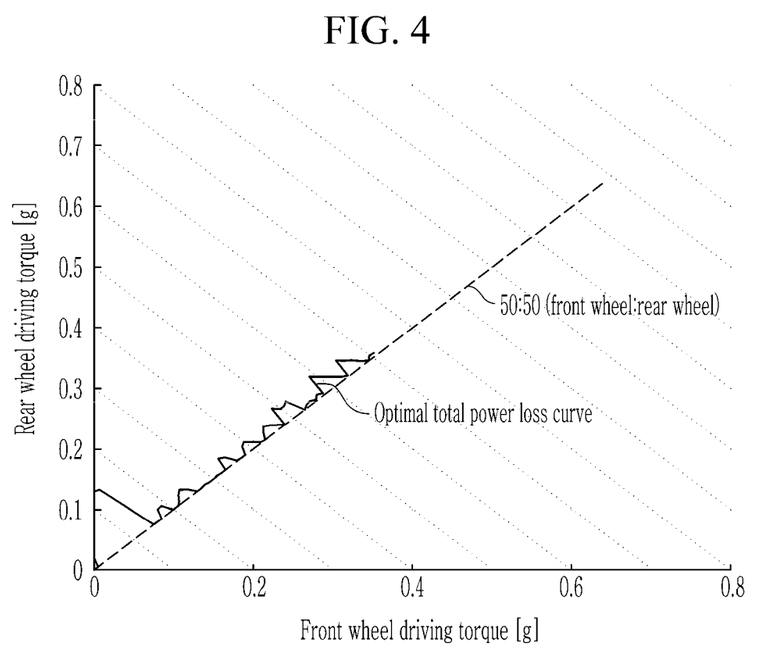
FIG. 4 is a graph for explaining braking torques of a front wheel and a rear wheel in a braking situation according to an exemplary embodiment of the present disclosure.
Figure 5:
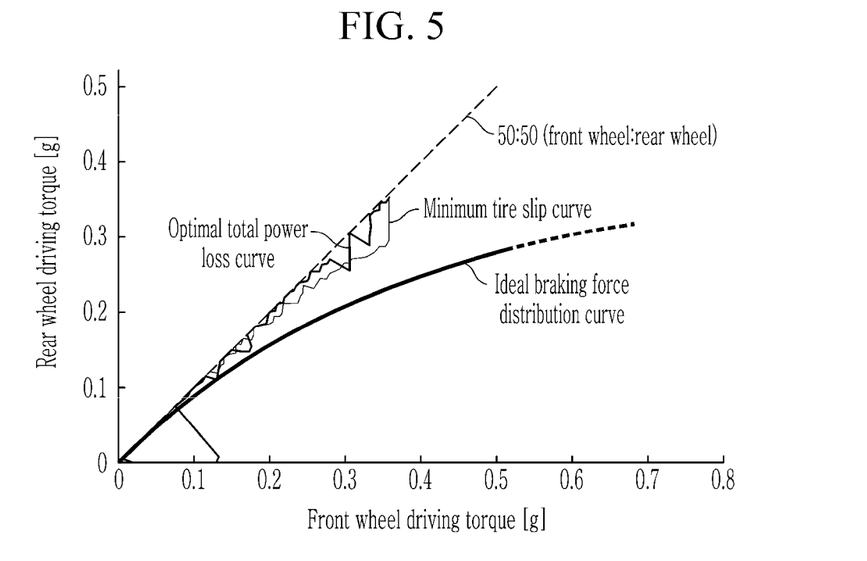
FIG. 5 and FIG. 6 are graphs for explaining driving torques of a front wheel and a rear wheel in a driving situation according to an exemplary embodiment of the present disclosure.
Figure 6:
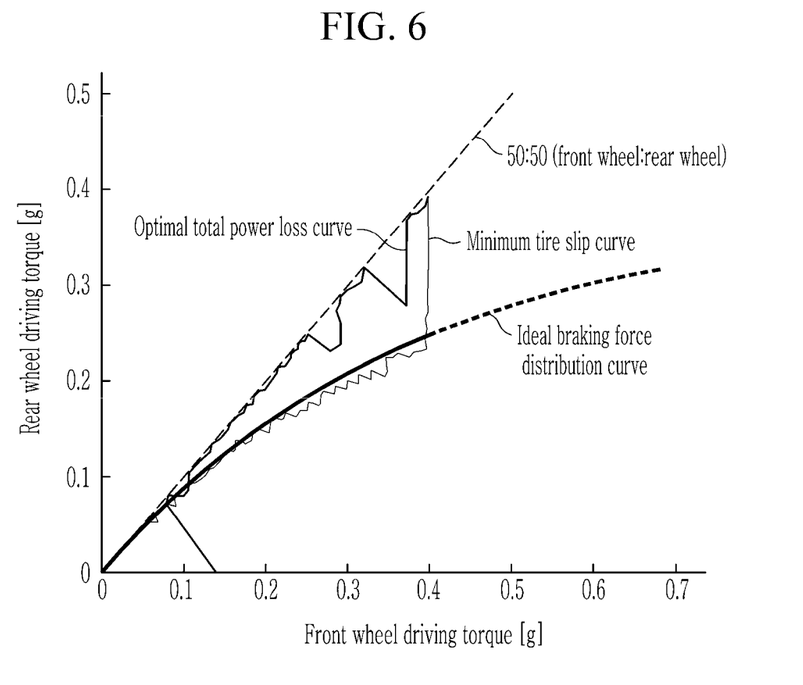

Referring to FIG. 4, FIG. 5, and FIG. 6, the optimal total power loss curve means a curve by which a power loss of the drive motor 20 and a power loss of each tire due to slip may be minimized.

The power loss of the drive motor 20 may be determined from efficiency of the drive motor 20. Efficiency of the drive motor 20 may be determined through Equation 1 below.

$$\eta = \begin{cases} \dfrac{T\omega}{P_{inv}}, & \text{when } T > 0 \\ \dfrac{P_{inv}}{T\omega}, & \text{when } T < 0 \end{cases}$$ [Equation 5]

Here, $\eta$ is efficiency of the drive motor 20, $P_{inv}$ is an inverter power, T is torque of the drive motor 20, and w is speed (e.g., rpm) of the drive motor 20.

The power loss $P_{EM}$ of the drive motor 20 may be determined through Equation 6 below.

$$P_{EM} = f_{EM}(T, \omega) = \begin{cases} T\omega\left(\dfrac{1}{\eta} - 1\right), & \text{when } T > 0 \\ T\omega(1 - \eta), & \text{when } T < 0 \end{cases} \quad \text{[Equation 6]}$$

The power loss of the tire may be divided into a power loss due to longitudinal slip and a power loss due to lateral slip.

The power loss due to longitudinal slip may be determined through Equation 7 below.

$$P_{tyre,\sigma} = \sum_{ij} F_{x,ij}(R_{ij}\omega_{ij} - v_{x,ij}) \quad \text{[Equation 7]}$$

Here, $R_{ij}$ is the rolling radius of the tire in local coordinates, $F_{x,ij}$ is a longitudinal force in local coordinates, w is a wheel speed in local coordinates, and $v_{x,ij}$ is a longitudinal vehicle speed in local coordinates.

The power loss due to lateral slip may be determined through Equation 8 below.

$$P_{tyre,\alpha} = \sum_{ij} F_{y,ij} v_{y,ij} \quad \text{[Equation 8]}$$

Here, $F_{y,ij}$ is a lateral force in local coordinates, and $v_{y,ij}$ is a lateral vehicle speed in local coordinates.

Total power loss of the vehicle is determined as a sum of the power loss of the drive motor 20 and power loss of the tire, and may be expressed as Equation 9 below.

$$P_{loss} = P_{EM} + P_{tyre,\sigma} + P_{tyre,\alpha} \quad \text{[Equation 9]}$$

At the S70 step, when the vehicle state is the braking state, the controller 40 compares a minimum tire slip curve and an ideal braking force distribution curve, and distributes the braking force (or, braking torque) of the front wheel and the rear wheel.

Referring to FIG. 5 and FIG. 6, the minimum tire slip curve means a front wheel braking force and a rear wheel braking force by which the tire slip is minimized. The minimum tire slip curve may be predetermined according to the type of tire and stored in the memory of the controller 40.

To simultaneously consider the vehicle stability and the braking force, the front wheel and the rear wheel may be simultaneously locked. To the present end, the braking force may be differently distributed to the front wheel and the rear wheel, and the ideal braking force distribution curve means an ideal relationship between the front wheel braking force and the rear wheel braking force. The ideal braking force distribution curve may be predetermined according to the type of tire and stored in the memory of the controller 40.

In FIG. 5 and FIG. 6, the horizontal axis means the braking force of the front wheel, and the vertical axis means the braking force of the rear wheel. That the minimum tire slip curve is greater than the ideal braking force distribution curve may mean that the braking force of the rear wheel determined by the minimum tire slip curve is greater than the braking force of the rear wheel determined by the ideal braking force distribution curve.

Referring to FIG. 5, at step S81, when the minimum tire slip curve exceeds the ideal braking force distribution curve, the controller 40 may distribute the braking torques of the front wheel and the rear wheel according to the optimal total power loss curve.

When the minimum tire slip curve is greater than the ideal braking force distribution curve, because the rear tires are slip-resistant, the braking torques of the front wheel and the rear wheel are distributed according to the optimal total power loss curve.

Referring to FIG. 6, when the minimum tire slip curve is smaller than or equal to the ideal braking force distribution curve, since slip of the rear tire is caused, the controller 40 applies, in the early stage of braking, the braking torque according to the optimal total power loss curve, only to the front wheel without applying the braking torque to the rear wheel. Thereafter, the braking torque is distributed to the front wheel and the rear wheel according to the ideal braking force distribution curve, from the time point at which the optimal total power loss curve coincides with the ideal braking force distribution curve.

For example, when the minimum tire slip curve is less than the ideal braking force distribution curve, since the rear tires are not slip-resistant, in the early stage of braking (e.g., until the front wheel braking force becomes about 0.14 g), the braking force is applied only to the front wheel according to the optimal total power loss curve. Furthermore, until the optimal total power loss curve coincide with the ideal braking force distribution curve, the braking force is applied to the front wheel and the rear wheel according to the optimal total power loss curve. Thereafter, from the time point when the optimal total power loss curve coincide with the ideal braking force distribution curve, the braking force is applied to the front wheel and the rear wheel according to the ideal braking force distribution curve.

Meanwhile, the step S60 of comparing the above-described wheel slip with the reference slip amount is executed after the step S30 and S40 of performing the feedback-control according to the yaw error. Securing lateral stability of the vehicle due to yaw error takes preferential to securing electricity mileage of the vehicle. Therefore, the vehicle body stability due to yaw error may be secured preferentially, and only then torque distribution of the front wheel and the rear wheel may be performed according to wheel slip.

Figure 7:
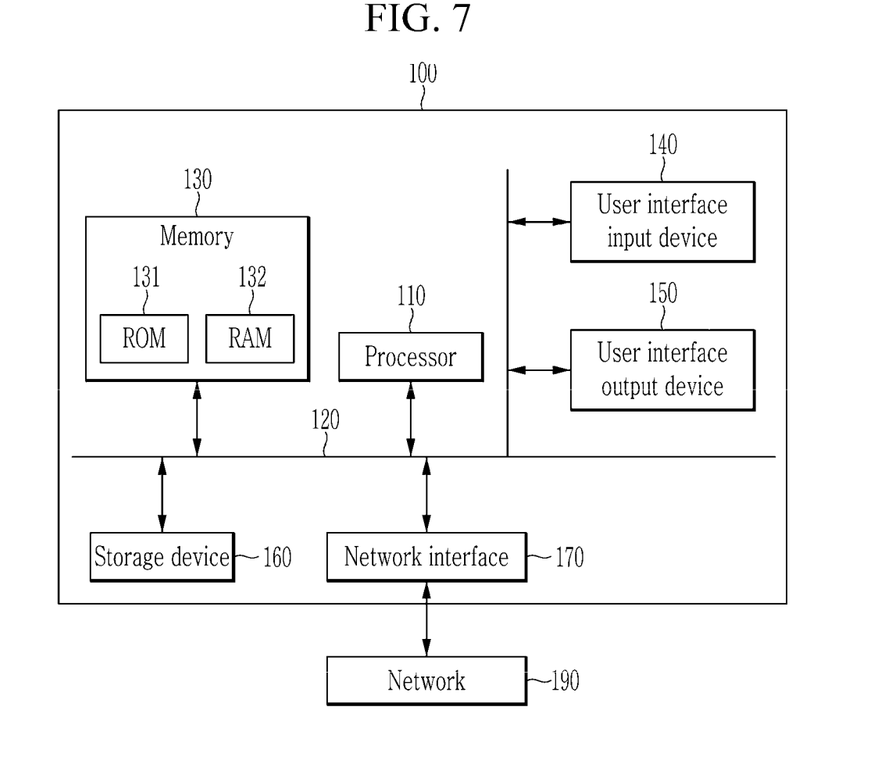
FIG. 7 is a drawing for explaining a computing device according to another exemplary embodiment of the present disclosure.

FIG. 7 is a drawing for explaining a computing device according to another exemplary embodiment of the present disclosure.

Referring to FIG. 7, a method for controlling an electric vehicle according to various exemplary embodiments of the present disclosure may be implemented by use of a computing device 100.

The computing device 100 may include at least one of a processor 110, a memory 130, a user interface input device 140, a user interface output device 150 and a storage device 160 that communicate through a bus 120. The computing device 100 may also include a network interface 170 electrically connected to a network 190. The network interface 170 may transmit or receive signals with other entities through the network 190.

The processor 110 may be implemented in various types such as a micro controller unit (MCU), an application processor (AP), a central processing unit (CPU), a graphic processing unit (GPU), a neural processing unit (NPU), and the like, and may be any type of semiconductor device configured for executing instructions stored in the memory 130 or the storage device 160. The processor 110 may be configured to implement the functions and methods described above with respect to FIG. 1 to FIG. 8.

The memory 130 and the storage device 160 may include various types of volatile or non-volatile storage media. For example, the memory may include read-only memory (ROM) 131 and a random-access memory (RAM) 132. In the exemplary embodiment of the present disclosure, the memory 130 may be located inside or outside the processor 110, and the memory 130 may be connected to the processor 110 through various known means.

In various exemplary embodiments of the present disclosure, at least some configurations or functions of an apparatus and method according to various exemplary embodiments of the present disclosure may be implemented as a program or software executable by the computing device 100, and program or software may be stored in a computer-readable medium.

In various exemplary embodiments of the present disclosure, at least some configurations or functions of an apparatus and method according to various exemplary embodiments of the present disclosure may be implemented by use of hardware or circuitry of the determining device 100, or may also be implemented as separate hardware or circuitry that may be electrically connected to the computing device 100.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In the present specification, unless stated otherwise, a singular expression includes a plural expression unless the context clearly indicates otherwise.

In exemplary embodiments of the present disclosure, "at least one of A and B" may refer to "at least one of A or B" or "at least one of combinations of at least one of A and B". Furthermore, "one or more of A and B" may refer to "one or more of A or B" or "one or more of combinations of one or more of A and B".

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A method for controlling a vehicle, the method comprising:

receiving, by a controller, driving information including a requested driving torque, a requested braking torque, and a steering angle of a driver, from a detection unit;

distributing, by the controller, a driving torque or a braking torque to a left wheel and a right wheel of the vehicle based on a predetermined reference yaw moment determined according to the steering angle depending on a vehicle speed, to follow the requested driving torque or the requested braking torque;

determining, by the controller, whether a vehicle state is a braking state;

distributing a driving torque to a front wheel and a rear wheel, by the controller, according to an optimal total power loss curve minimizing a power loss of the vehicle, in response that the vehicle state is a driving state, wherein the optimal total power loss curve is a curve by which a power loss of a drive motor and a power loss of each tire due to slip are minimized; and distributing a braking torque to the front wheel and the rear wheel, by the controller, by comparing a minimum tire slip curve and an ideal braking force distribution curve, in response that the vehicle state is the braking state, wherein the minimum tire slip curve means a front wheel braking force and a rear wheel braking force by which a tire slip is minimized, and wherein the ideal braking force distribution curve is an ideal relationship between the front wheel braking force and the rear wheel braking force in which the front wheel and the rear wheel are simultaneously locked.

2. The method of claim 1, further including:

determining, by the controller, whether a yaw error is between a first error amount and a second error amount; and feedback-controlling the driving torque or the braking torque of the left wheel and the right wheel determined based on the reference yaw moment, in response that the yaw error is between the first error amount and the second error amount greater than the first error amount.

3. The method of claim 2, wherein the reference yaw moment is compensated through an equation of $$M_z^{HL} = M_z^{ref} + k_{p,\psi}(\dot{\psi}_{ref} - \dot{\psi}) + k_{i,\psi}\int(\dot{\psi}_{ref} - \dot{\psi})\,dt,$$

wherein, $M_z^{HL}$ is a compensated yaw moment, $M_z^{ref}$ is the reference yaw moment, $k_{p,\psi}$ is a proportional gain, $\dot{\psi}_{ref}$ is a reference yaw rate, $\dot{\psi}$ is the yaw rate, and $k_{i,\psi}$ is an integral gain.

4. The method of claim 3, wherein the driving torque or the braking torque of the left wheel is determined by an equation of $$T_L = \frac{1}{2}\left(T_{total} - \frac{2R}{w}M_z^{HL}\right);$$

and the driving torque or the braking torque of the right wheel is determined by an equation of $$T_R = \frac{1}{2}\left(T_{total} + \frac{2R}{w}M_z^{HL}\right),$$

wherein $T_{total}$ is a total driving torque or a total braking torque.

5. The method of claim 2, wherein, in response that the yaw error is greater than or equal to the second error amount:
the braking torque or the driving torque of the left wheel and the right wheel is determined by a vehicle dynamics control module.

6. The method of claim 1, further including:
determining, by the controller, whether a wheel slip is greater than or equal to a reference slip amount; and
determining, by a vehicle dynamics control module, the braking torque or the driving torque of the left wheel and the right wheel, in response that the wheel slip is greater than or equal to the reference slip amount.

7. The method of claim 1, wherein, in response that the minimum tire slip curve exceeds the ideal braking force distribution curve, the braking torque is distributed to the front wheel and the rear wheel according to the optimal total power loss curve.

8. The method of claim 7, wherein, in response that the minimum tire slip curve is smaller than or equal to the ideal braking force distribution curve:
the braking torque is distributed to the front wheel and the rear wheel according to the optimal total power loss curve until the minimum tire slip curve and the ideal braking force distribution curve coincide with each other; and
the braking torque is distributed to the front wheel and the rear wheel according to the ideal braking force distribution curve from a time point in which the minimum tire slip curve and the ideal braking force distribution curve coincide with each other.

9. A non-transitory computer-readable medium storing a program for executing, by the controller including a processor configured to execute a program or instruction stored in a memory or a storage device, the method for controlling the vehicle of claim 1.

10. A control apparatus for controlling a vehicle, the apparatus comprising:
a detection unit configured for detecting a requested driving torque, a requested braking torque, and a steering angle of a driver;
a drive motor and a braking device;
a controller operatively connected to the detection unit, the drive motor and the braking device and configured for:
receiving the driving information from the detection unit;
distributing a driving torque or a braking torque to a left wheel and a right wheel of the vehicle based on a predetermined reference yaw moment determined according to the steering angle depending on a vehicle speed, to follow the requested driving torque or the requested braking torque by controlling the drive motor and the braking device connected to the left wheel and the right wheel;
determining whether a vehicle state is a braking state;
distributing a driving torque to a front wheel and a rear wheel of the vehicle according to an optimal total power loss curve minimizing a power loss of the vehicle by controlling the drive motor connected to the front wheel and the rear wheel, in response that the vehicle state is a driving state, wherein the optimal total power loss curve is a curve by which a power loss of the drive motor and a power loss of each tire due to slip is minimized; and
distributing a braking torque to the front wheel and the rear wheel by controlling the braking device connected to the front wheel and the rear wheel, with comparing a minimum tire slip curve and an ideal braking force distribution curve, in response that the vehicle state is the braking state,
wherein the minimum tire slip curve means a front wheel braking force and a rear wheel braking force by which a tire slip is minimized, and
wherein the ideal braking force distribution curve is an ideal relationship between the front wheel braking force and the rear wheel braking force in which the front wheel and the rear wheel are simultaneously locked.

11. The apparatus of claim 10, further including:
determining whether a yaw error is between a first error amount and a second error amount; and
feedback-controlling the driving torque or the braking torque of the left wheel and the right wheel determined based on the reference yaw moment by controlling the drive motor or the braking device connected to the left wheel and the right wheel, in response that the yaw error is between the first error amount and the second error amount greater than the first error amount.

12. The apparatus of claim 11, wherein the reference yaw moment is compensated through an equation of $$M_z^{HL} = M_z^{ref} + k_{p,\psi}(\dot{\psi}_{ref} - \dot{\psi}) + k_{i,\psi}\int(\dot{\psi}_{ref} - \dot{\psi})\,dt,$$

wherein, $M_z^{HL}$ is a compensated yaw moment, $M_z^{ref}$ is the reference yaw moment, $k_{p,\psi}$ is a proportional gain, $\dot{\psi}_{ref}$ is a reference yaw rate, $\dot{\psi}$ is the yaw rate, and $k_{i,\psi}$ is an integral gain.

13. The apparatus of claim 12, wherein
the driving torque or the braking torque of the left wheel is determined by an equation of $$T_L = \frac{1}{2}\left(T_{total} - \frac{2R}{w}M_z^{HL}\right);$$

and the driving torque or the braking torque of the right wheel is determined by an equation of $$T_R = \frac{1}{2}\left(T_{total} + \frac{2R}{w}M_z^{HL}\right),$$

wherein $T_{total}$ is a total driving torque or a total braking torque.

14. The apparatus of claim 12, wherein, in response that the yaw error is greater than or equal to the second error amount, the controller is configured for determining the braking torque or the driving torque of the left wheel and the right wheel.

15. The apparatus of claim 10, wherein the controller is further configured for:
- determining whether a wheel slip is greater than or equal to a reference slip amount; and
- determining the braking torque or the driving torque of the left wheel and the right wheel, in response that the wheel slip is greater than or equal to the reference slip amount.

16. The apparatus of claim 10, wherein, in response that the minimum tire slip curve exceeds the ideal braking force distribution curve, the controller is further configured for distributing the braking torque to the front wheel and the rear wheel by controlling the braking device according to the optimal total power loss curve.

17. The apparatus of claim 16, wherein, in response that the minimum tire slip curve is smaller than or equal to the ideal braking force distribution curve:
- the controller is further configured for distributing the braking torque to the front wheel and the rear wheel by controlling the braking device according to the optimal total power loss curve until the minimum tire slip curve and the ideal braking force distribution curve coincide with each other; and
- the controller is further configured for distributing the braking torque to the front wheel and the rear wheel by controlling the braking device according to the ideal braking force distribution curve from a time point in which the minimum tire slip curve and the ideal braking force distribution curve coincide with each other.

\* \* \* \* \*